(12) United States Patent
Svensson et al.

(10) Patent No.: US 11,844,303 B2
(45) Date of Patent: Dec. 19, 2023

(54) ROBOTIC WORK TOOL AND A METHOD FOR USE IN A ROBOTIC WORK TOOL COMPRISING A LIFT/COLLISION DETECTION DEVICE

(71) Applicant: Husqvarna AB, Huskvarna (SE)

(72) Inventors: Mats Svensson, Huskvarna (SE);
Pär-Ola Svensson, Foreserum (SE);
Magnus Öhrlund, Malmbäck (SE);
Fredrik Kallström, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 823 days.

(21) Appl. No.: 16/496,576

(22) PCT Filed: Feb. 28, 2018

(86) PCT No.: PCT/SE2018/050191
§ 371 (c)(1),
(2) Date: Sep. 23, 2019

(87) PCT Pub. No.: WO2018/174774
PCT Pub. Date: Sep. 27, 2018

(65) Prior Publication Data
US 2020/0315087 A1 Oct. 8, 2020

(30) Foreign Application Priority Data
Mar. 23, 2017 (SE) .................................. 1750347-5

(51) Int. Cl.
*A01D 34/00* (2006.01)
*A01D 75/18* (2006.01)
(Continued)

(52) U.S. Cl.
CPC ........... *A01D 34/008* (2013.01); *A01D 75/18* (2013.01); *G05D 1/0265* (2013.01);
(Continued)

(58) Field of Classification Search
CPC .. A01D 34/008; A01D 75/18; A01D 2101/00; A01D 75/185; A01D 75/20;
(Continued)

(56) References Cited

U.S. PATENT DOCUMENTS 9,405,294 B2 * 8/2016 Jägenstedt ........... G05D 1/0265
2004/0117064 A1 6/2004 McDonald
(Continued)

FOREIGN PATENT DOCUMENTS

CN 104135846 A 11/2014
CN 106458273 A 2/2017
(Continued)

OTHER PUBLICATIONS

Search Report for Swedish Application No. 1750347-5 dated Nov. 16, 2017.
(Continued)

*Primary Examiner* — Jeff A Burke
*Assistant Examiner* — Kyle T Johnson
(74) *Attorney, Agent, or Firm* — Burr & Forman LLP

(57) ABSTRACT

A robotic work tool having a chassis, a cover and a controller for controlling the operation of the robotic work tool. The robotic work tool further has a lift/collision detection device (300) connected to the controller for providing sensor input, and which Hft/coUision detection device (300) includes a first sensor element (340) and a second sensor element (345). The controller (110) is configured to receive sensor input of a distance value indicating a distance between the first sensor element (340) and the second sensor element (345), determine that a lift has been detected, fay comparing the distance value with a lift detection threshold and/or determine that a collision has been detected, by comparing
(Continued)

the distance value with a collision detection threshold, wherein the collision detection threshold is different from the lift detection threshold.

12 Claims, 7 Drawing Sheets

(51) Int. Cl.
*A01D 101/00* (2006.01)
*G05D 1/02* (2020.01)

(52) U.S. Cl.
CPC ....... *A01D 2101/00* (2013.01); *G05D 1/0225* (2013.01); *G05D 1/0227* (2013.01); *G05D 2201/0208* (2013.01)

(58) Field of Classification Search
CPC .. A01D 34/00; A47L 2201/04; G05D 1/0265; G05D 1/0225; G05D 1/0227; G05D 2201/0208; G05D 1/02
See application file for complete search history.

(56) References Cited

U.S. PATENT DOCUMENTS

| | | | | |
|---|---|---|---|---|
| 2005/0253578 | A1* | 11/2005 | Kawashima | G01D 5/145 324/207.2 |
| 2011/0190931 | A1* | 8/2011 | Anderson | A01D 34/008 427/136 |
| 2013/0041577 | A1* | 2/2013 | Puhalla | B60W 40/112 701/124 |
| 2014/0373497 | A1* | 12/2014 | Bjorn | A01D 75/18 56/10.2 R |
| 2016/0378116 | A1* | 12/2016 | Nguyen | B25J 5/007 701/23 |
| 2018/0184583 | A1* | 7/2018 | Morin | A01D 34/008 |
| 2018/0184585 | A1* | 7/2018 | Song | A01D 34/74 |
| 2020/0367428 | A1* | 11/2020 | Olsson | A01D 34/828 |

FOREIGN PATENT DOCUMENTS

| | | | |
|---|---|---|---|
| DE | 202012102637 U1 | 10/2013 | |
| EP | 2425700 A2 * | 3/2012 | ........... A01D 34/008 |
| EP | 2425700 A2 | 3/2012 | |
| EP | 2687077 A2 | 1/2014 | |
| EP | 2692220 A1 * | 2/2014 | ........... A01D 34/008 |
| EP | 2692220 A1 | 2/2014 | |
| EP | 2803255 A1 | 11/2014 | |
| EP | 3342267 A1 * | 7/2018 | ........... A01D 34/006 |
| EP | 3470946 A1 | 4/2019 | |
| WO | 02/39868 A1 | 5/2002 | |
| WO | 2011143681 A1 | 11/2011 | |
| WO | 2013/125992 A1 | 8/2013 | |
| WO | 2013/125995 A1 | 8/2013 | |
| WO | 03/103375 A1 | 12/2013 | |
| WO | 2014/007728 A1 | 1/2014 | |
| WO | 2015/115954 A1 | 8/2015 | |
| WO | 2015/161889 A1 | 10/2015 | |
| WO | 2016/150510 A1 | 9/2016 | |

OTHER PUBLICATIONS

Search Report for Swedish Application No. 1751013-2 dated Feb. 16, 2018.
International Search Report and Written Opinion for International Application No. PCT/SE2018/050191 dated May 3, 2018.
International Search Report and Written Opinion for International Application No. PCT/SE2018/050240 dated May 16, 2018.
International Preliminary Report on Patentability for International Application No. PCT/SE2018/050240 dated Sep. 24, 2019.
International Preliminary Report on Patentability for International Application No. PCT/SE2018/050191 dated Sep. 24, 2019.
Ohkawa et al., "Development of the Autonomous Brush-cutting Robot using Articulated Steering Vehicle", ISR/Robotik 2014; 41st International Symposium on Robotics, vol. 80, Issue 812, Jun. 24, 2014, pp. 164-169.

* cited by examiner

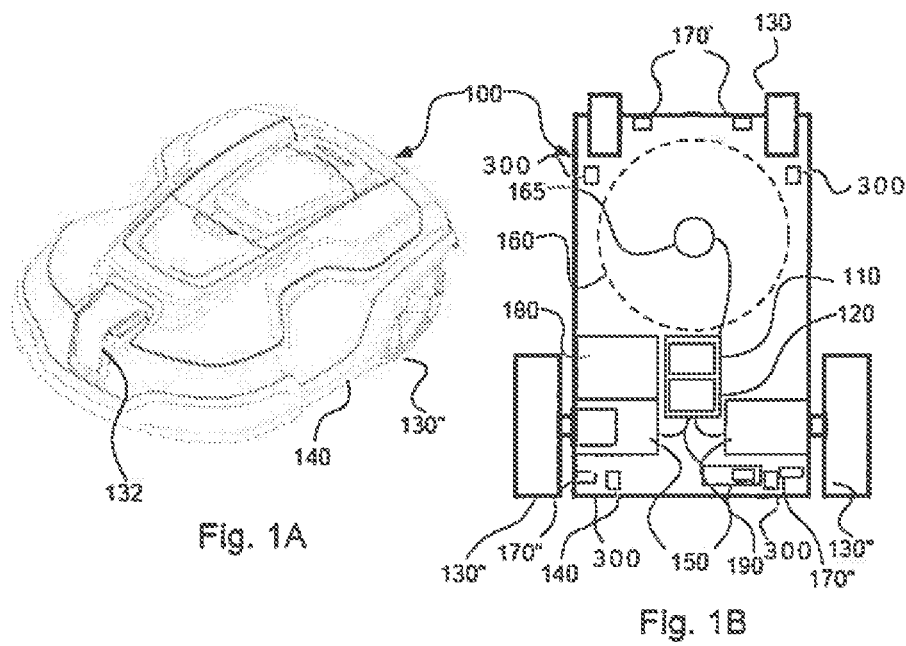
Fig. 1A
Fig. 1B
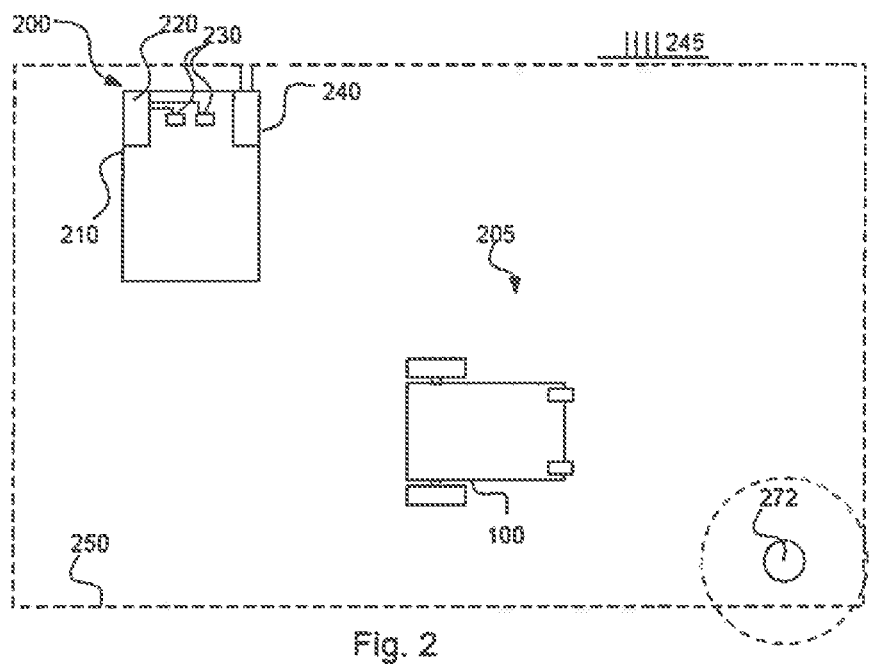
Fig. 2

ROBOTIC WORK TOOL AND A METHOD FOR USE IN A ROBOTIC WORK TOOL COMPRISING A LIFT/COLLISION DETECTION DEVICE

TECHNICAL FIELD

This application relates to robotic work tools and in particular to a robotic work tool and a method for performing improved lift and collision detection to be performed by a robotic work tool, such as a lawnmower.

BACKGROUND

Automated or robotic power tools such as robotic lawnmowers are becoming increasingly more popular. In a typical deployment, a work area, such as a garden, the robotic work tool may not be aware of many objects, stationary or movable, tat the robotic work tool may collide with. As such, collision detection is necessary in order to enable toe robotic work tool to adapt its operation when a collision is detected, to avoid the robotic work tool from simply stopping in front of the object by trying to push through it.

Likewise, it is important—also from a safety perspective—to detect that a robotic work tool is lifted, so that the operating member or tool, such as the rotating knife of a robotic lawnmower may be turned off to prevent risk of injuring an operator.

The lift and collision detection is usually achieved by arranging the cover of the robotic work tool from being movable in relation to the chassis or main body of the robotic work tool. Such arrangements usually comprise a movable or slidable member which movements are monitored and if a movement in an XY plane (the same as that of the surface being worked) is detected a collision is detected. And, if a movement in a Z direction (normal to the XY plane), a lift is detected.

However, in many arrangements a collision also gives rise to a movement in a Z direction, whereby a lift may be falsely detected.

As a lift detection usually turns of any active member or tool of the robotic work tool, a falsely detected lift will impair the operation of the robotic work tool, which is of course unwanted.

One prior art solution to avoid false positives is presented in the US patent application published as US2014/0373497A1, wherein lift detection arrangement in a robotic lawnmower for detecting a lift of a body relative a chassis of the robotic lawnmower is provided. The lift detection arrangement comprises a connection between the chassis and the body. The connection comprises a joystick element arranged to allow a displacement of the body relative the chassis in a collision plane during a collision, and a lift element arranged to provide a flexibility between the chassis and the body in a lift direction during the lift. The lift detection arrangement further comprises a lift sensor configured to detect a displacement over a predetermined threshold of the lift element during the lift by detecting a change in spacing between two sensor parts. One of the two sensor parts is arranged on the lift element and the two sensor parts are arranged to be relatively displaceable only in the lift direction is disclosed. In order to avoid false positives, the two sensor elements are both positioned on the pivotable joystick member, one on the joystick, and one on the lift element. As such, they will both move if a collision occurs and the joystick only pivots, and any false positives are avoided.

However, this suffers from the drawbacks that in order to allow for rather hard collisions to be able to be detected without registering a false positive, the pivotable joystick need to be constructed so that it is not elongated during the pivot, and also, that the joystick is arranged with a second sensor arrangement for detecting the actual pivoting, i.e. the collision. As such, the prior art arrangement is costly and requires careful design taking many factors relating to operating speed, weight and so on in to consideration making the arrangement being specific to only a few models, which requires manufacture of several different joysticks making any repair shop having to hold several models of joystick in stock to adequately service a range of models.

Thus, there is a need for improved lift collision detection for a robotic work tool requiring fewer components and being adaptable to different models.

SUMMARY

It is therefore an object of the teachings of this application to overcome or at least reduce those problems and problems discussed below by providing a robotic work tool comprising a chassis, a cover, and a controller for controlling the operation of the robotic work tool. The robotic work tool may further comprise a lift/collision detection device connected to the controller for providing sensor input, and which lift/collision detection device comprises a first sensor element and a second sensor element. The controller may be configured to:
receive sensor input of a distance value indicating a distance between the first sensor element and the second sensor element;
determine that a lift has been detected, by comparing the distance value with a lift detection threshold and/or
determine that a collision has been detected, by comparing the distance value with a collision detection threshold, wherein the collision detection threshold is different from the lift detection threshold. By way of example, the controller may be configured to determine that a lift has been detected if the distance value is larger than the lift detection threshold. Similarly, the controller may be configured to determine that a collision has been detected if the distance value is larger than the collision detection threshold. According to an embodiment, the lift detection threshold may be larger than the collision detection threshold.

The first and second sensor elements may be mechanically connected to the chassis and cover in such a manner that a horizontal movement between cover and chassis transmits to a change of distance between said sensor elements with a first transmission ratio, and a vertical movement between cover and chassis transmits to a change of distance between the sensor elements with a second transmission ratio, which second transmission ratio is different from the first transmission ratio. Thereby, a horizontal movement and a vertical movement of the same magnitude will result in different changes of the distance, and thereby different distance values detected by the detection device.

It is also an object of the teachings of this application to overcome the problems by providing a method for use in a robotic work tool comprising a chassis, a cover and a controller for controlling the operation of the robotic work tool. The robotic work tool further comprising a lift/collision detection device connected to the controller for providing sensor input, and which lift/collision detection device comprises a first sensor element and a second sensor element. The method comprising:

receiving sensor input of a distance value indicating a distance between the first sensor element and the second sensor element;

determining that a lift has been detected, by comparing the distance value with a lift detection threshold and/or determining that a collision has been detected, by comparing the distance value with a collision detection threshold, wherein the collision detection threshold is different from the lift detection threshold.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which:

FIG. 1A shows an example of a robotic lawnmower according to one embodiment of the teachings herein;

FIG. 1B shows a schematic view of the components of an example of a robotic lawnmower according to one embodiment of the teachings herein;

FIG. 2 shows an example of a robotic lawnmower system according to the teachings herein;

DETAILED DESCRIPTION

Figure 3:
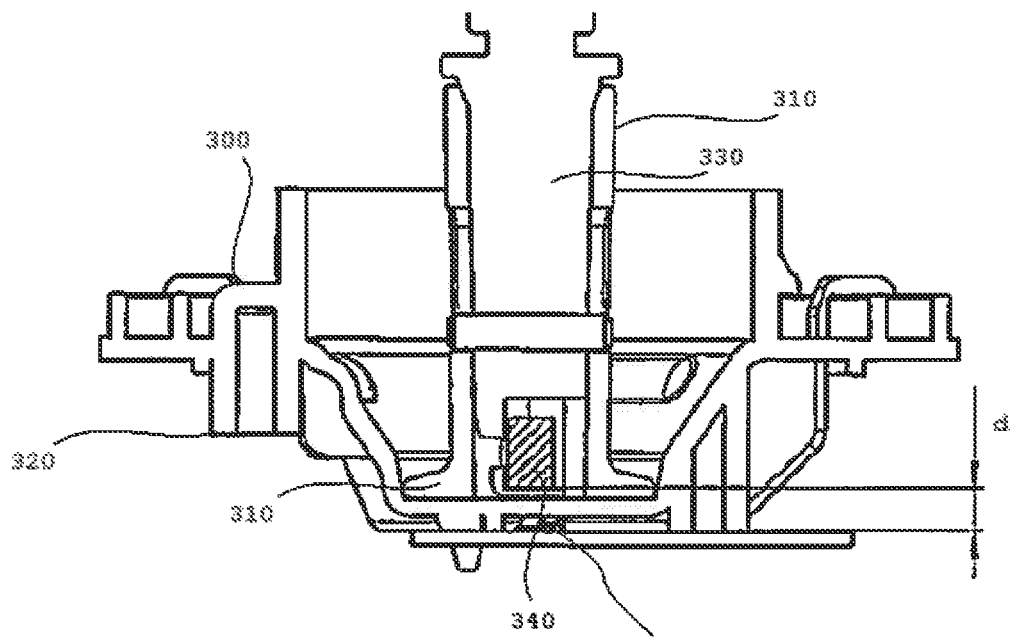
FIG. 3 shows a schematic illustration of a lift/collision detection device of the robotic lawnmower of FIG. 1A, as seen in cross-section, according to a first embodiment.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

It should be noted that all indications of rotational speeds, time durations, workloads, battery levels, operational levels etc. are given as examples and may be varied in many different ways as would be apparent to a skilled person. The variations may be for individual entities as well as for groups of entities and may be absolute or relative.

FIG. 1A shows a perspective view of a robotic working tool 100, here exemplified by a robotic lawnmower 100, having a body comprising a cover 132 and a chassis 140 and a plurality of wheels 130 (only one shown). As can be seen, the robotic lawnmower 100 may comprise charging skids for contacting contact plates (not shown in FIG. 1, but referenced 230 in FIG. 2) when docking into a charging station (not shown in FIG. 1, but referenced 210 in FIG. 2) for receiving a charging current through, and possibly also for transferring information by means of electrical communication between the charging station and the robotic lawnmower 100.

FIG. 1B shows a schematic overview of the robotic working tool 100, also exemplified here by a robotic lawnmower 100, having a chassis 140 and a plurality of wheels 130.

It should be noted that even though the description given herein will be focused on robotic lawnmowers, the teachings herein may also be applied to robotic cleaners such as robotic vacuum cleaners and/or robotic floor cleaners, robotic ball collectors, robotic mine sweepers, robotic farming equipment, o other robotic work tools to be employed in a work area defined by a boundary cable.

In the exemplary embodiment of FIG. 1B the robotic lawnmower 100 has 4 wheels 130, two front wheels 130' and the rear wheels 130". At least some of the wheels 130 are drivably connected to at least one electric motor 150. It should be noted that even if the description herein is focused on electric motors, combustion engines may alternatively be used possibly in combination with an electric motor.

In the example of FIG. 1B, each of the rear wheels 130" is connected to a respective electric motor 150. This allows for driving the rear wheels 130" independently of one another which, for example, enables steep turning.

The robotic lawnmower 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further have at least one sensor 170; in the example of FIG. 1 there are four sensors divided into a first sensor pair 170' and a second sensor pair 170", respectively arranged at each wheel 130', 130" to detect a magnetic field (not shown) and for detecting a boundary cable and/or for receiving (and possibly also sending) information from a signal generator (will be discussed with reference to FIG. 2). The sensors 170 may thus be arranged as front sensors 170' and rear sensors 170".

In some embodiments, the sensors 170 may be connected to the controller 110, and the controller 110 may be configured to process and evaluate any signals received from the sensor pairs 170, 170'. The sensor signals may be caused by the magnetic field being generated by a control signal being transmitted through a boundary cable. This enables the controller 110 to determine whether the robotic lawnmower 100 is close to or crossing a boundary cable, or inside or outside an area enclosed by the boundary cable. This also enables the robotic lawnmower 100 to receive (and possibly send) information from the control signal.

The robotic lawnmower 100 also comprises a grass cutting device 160, such as a rotating blade 160 driven by a cutter motor 165. The grass cutting device being an example of a work tool 160 for a robotic work tool 100. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic lawnmower 100 also has (at least) one battery 180 for providing power to the motors 150 and the cutter motor 165.

The robotic lawnmower 100 is also arranged with at least one lift/collision detection device 300 which will be described in greater detail with reference to FIG. 3 and an alternative embodiment will be described with reference to FIG. 5. In the example of FIG. 1A 1B, the robotic lawnmower 100 is arranged with four lift/collision detection devices 300, one arranged in each corner of the robotic lawnmower 100.

FIG. 2 shows a schematic view of a robotic working tool system 200 in one embodiment. The schematic view is not to scale. The robotic working tool system 200 comprises a charging station 210 and a boundary cable 250 arranged to enclose a work area 205, in which the robotic lawnmower 100 is supposed to serve.

As with FIG. 1, the robotic working tool is exemplified by a robotic lawnmower, but the teachings herein may also be applied to other robotic working tools adapted to operate within a work area.

The charging station may have a base plate 215 for enabling the robotic lawnmower to enter the charging station in a clean environment and for providing stability to the charging station 210.

The charging station 210 has a charger 220, in this embodiment coupled to two charging plates 230. The charging plates 230 are arranged to co-operate with corresponding charging plates (not shown) of the robotic lawnmower 100 for charging the battery 180 of the robotic lawnmower 100.

The charging station 210 also has, or may be coupled to, a signal generator 240 for providing a control signal 245 to be transmitted through the boundary cable 250. The signal generator thus comprises a controller for generating the control signal. The control signal 245 comprises an alternating current, such as a continuously or regularly repeated current signal. The control signal may be a CDMA signal (CDMA—Code Division Multiple Access). The control signal may also or alternatively be a pulsed control signal, the control signal thus comprising one or more current pulses being transmitted periodically. The control signal may also or alternatively be a continuous sinusoidal wave. As is known in the art, the current signal will generate a magnetic field around the boundary cable 250 which the sensors 170 of the robotic lawnmower 100 will detect. As the robotic lawnmower 100 (or more accurately, the sensor 170) crosses the boundary cable 250 the direction of the magnetic field will change. The robotic lawnmower 100 will thus be able to determine that the boundary cable has been crossed, and take appropriate action by controlling the driving of the rear wheels 130" to cause the robotic lawnmower 100 to turn a certain angular amount and return into the work area 205. For its operation within the work area 205, in the embodiment of FIG. 2, the robotic lawnmower 100 may alternatively or additionally use the satellite navigation device 190, supported by the deduced reckoning navigation sensor 195 to navigate the work area 205.

As can be seen in FIG. 2, there is one example of an object exemplified as a tree (trunk) 272.

FIG. 3 shows a view of a lift/collision detection device 300 according to one embodiment of the teachings herein to be used in a robotic work tool 100 such as the robotic lawnmower 100 of FIGS. 1A and 1B. The lift/collision detection device 300 comprises a joystick member 310 which is to be pivotably arranged to or in a base member 320, the base member, in one embodiment, being part of the chassis of the robotic lawnmower 100, and, in one embodiment, being a part of the lift/collision detection device 300. The joystick member 310 comprises a slidably arranged lift member 330. With slidably arranged it is to be understood that the two members may move with respect to one another in a linear fashion, one member thus sliding relative the other.

The slidably arranged lift member is connected, directly or indirectly to the cover of the robotic lawnmower 100. As such, the lift member 330 will move—or cause the joystick member 310 to move—when the cover moves relative the chassis, such as when a lift is executed or a collision occurs.

The lift member 330 comprises a first sensor element 340 and the base member comprises a second sensor element 345. The two sensor elements 340, 345 are arranged so that they are facing each other and at a small default distance d, when the lift/collision detection device 300 is at rest. With a small distance it is to be understood a distance short enough to allow for movements of the respective sensor elements while still being in sensory contact with each other. In one example such a distance is 0, 1, 1.5, 2, 2.5 or a distance between 0 and 2.5 mm.

In one embodiment, the lift/collision detection device 300 may be connected to the controller 110 to provide the controller 110 with sensor output, i.e. sensor signals to be processed by the controller 110 to determine the detection of a lift or collision.

In one embodiment, the lift/collision detection device 300 may comprise an internal controller to process the sensor signals to provide the controller 110 with sensor output indicating the detection of a lift or collision.

For the purpose of this application, no difference will be made between whether the lift/collision detection device 300 has an internal controller or not and both cases will be discussed as the device 300 providing the controller 110 with sensor input.

Figure 4A:
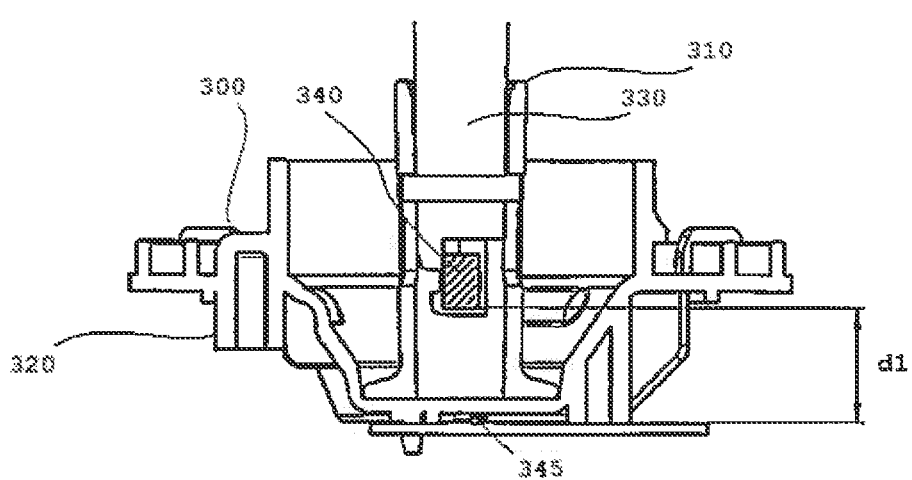
FIG. 4A shows a schematic illustration of the lift/collision detection device of FIG. 3 when detecting a lift.

FIG. 4A shows the lift/collision detection device 300 according to FIG. 3, when detecting a lift. As can be seen the lift member 330 has been lifted and therefore slid inside and relative the joystick member 310, now being at a distance d1 from the base member 320, the two sensor elements 340 and 345 thus now being at a distance d1 from each other. In one example such a distance is 5, 7.5, 10, 12.5, 15, 17.5, 20 mm or a distance between 5 and 25 mm, such as between 10 and 15 mm. As the lift distance d1 is substantially larger than the default distance d it is possible for the controller to (clearly) discern between the two and determine that a lift has been detected. The controller 110 is thus configured to receive a sensor input indicating a distance between the first and second sensor elements 340, 345, such as receiving or based on the sensor input determining a distance value indicative of the distance and to determine if the distance value is higher than a lift threshold value (such as the lift distance d1), and if so determine that a lift is detected. It should be noted that in the following, no difference will be made between determining a distance value indicative of a distance or from which a distance may be determined, and actually determining the indicated distance. A skilled person would understand that if the sensor provided a voltage signal where a low voltage indicated a short distance and a high voltage indicated a long distance, there would be no principal difference between comparing the voltage to a threshold voltage and determining a corresponding distance and comparing the determined distance to a threshold distance.

Figure 4B:
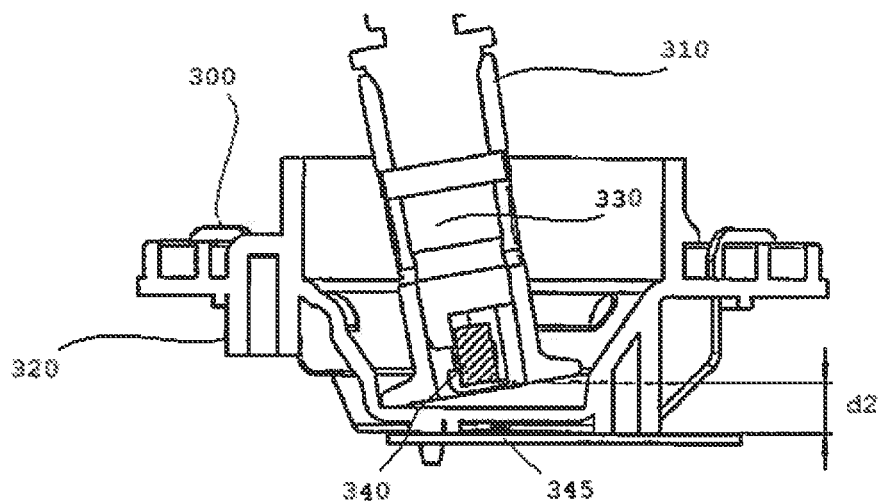
FIG. 4B shows a schematic illustration of the lift/collision detection device of FIG. 3 when detecting a collision.

FIG. 4B shows the lift/collision detection device 300 according to FIG. 3, when detecting a collision. As can be seen the joystick member 310 has been tilted or pivoted and the slidably arranged lift member 330 has slid inside and relative the joystick member 310, now being at a distance d2 from the base member 320, the two sensor elements 340 and 345 thus now being at a distance d2 from each other. In one example such a distance is 2, 2.5, 3, 3.5, 4, 4.5, 5 mm or a distance between 2 and 5 mm. As the collision distance d2 is substantially larger than the default distance d it is possible for the controller to (clearly) discern between the two, and, as the lift distance d1 is substantially larger than the collision distance d1 it is also possible for the controller to (clearly) discern between the two. Because of this, the controller may differentiate between a collision and a lift based on the distance received through the sensor input received from the lift/collision detection device 300, and based on this distance the controller is able to determine that a collision has been detected. The controller 110 is thus configured to receive a sensor input indicating a distance between the first and second sensor elements 340, 345 and to determine if the distance is higher than a collision threshold value (such as the collision distance d2), and if so determine that a collision is detected.

The first and second sensor elements 340, 345 may be implemented as a magnet and a Hall sensor.

In one embodiment, the sensor element comprising the Hall sensor, may comprise a first and a second Hall sensor, arranged with different sensitivities. The distance being compared to the thresholds can then be determined as that the distance is higher than the lift threshold if none of the Hall sensors senses the magnet, and that the distance is higher than the lift threshold if only one of the Hall sensors senses the magnet.

In one embodiment, the second sensor element 345 comprises the Hall sensor, for simplified connection of the sensor to the controller 110.

For small lift/collision detection devices 300, the first and second sensor elements 340, 345 may be implemented as two co-operating parts of a micro switch.

Figure 5:
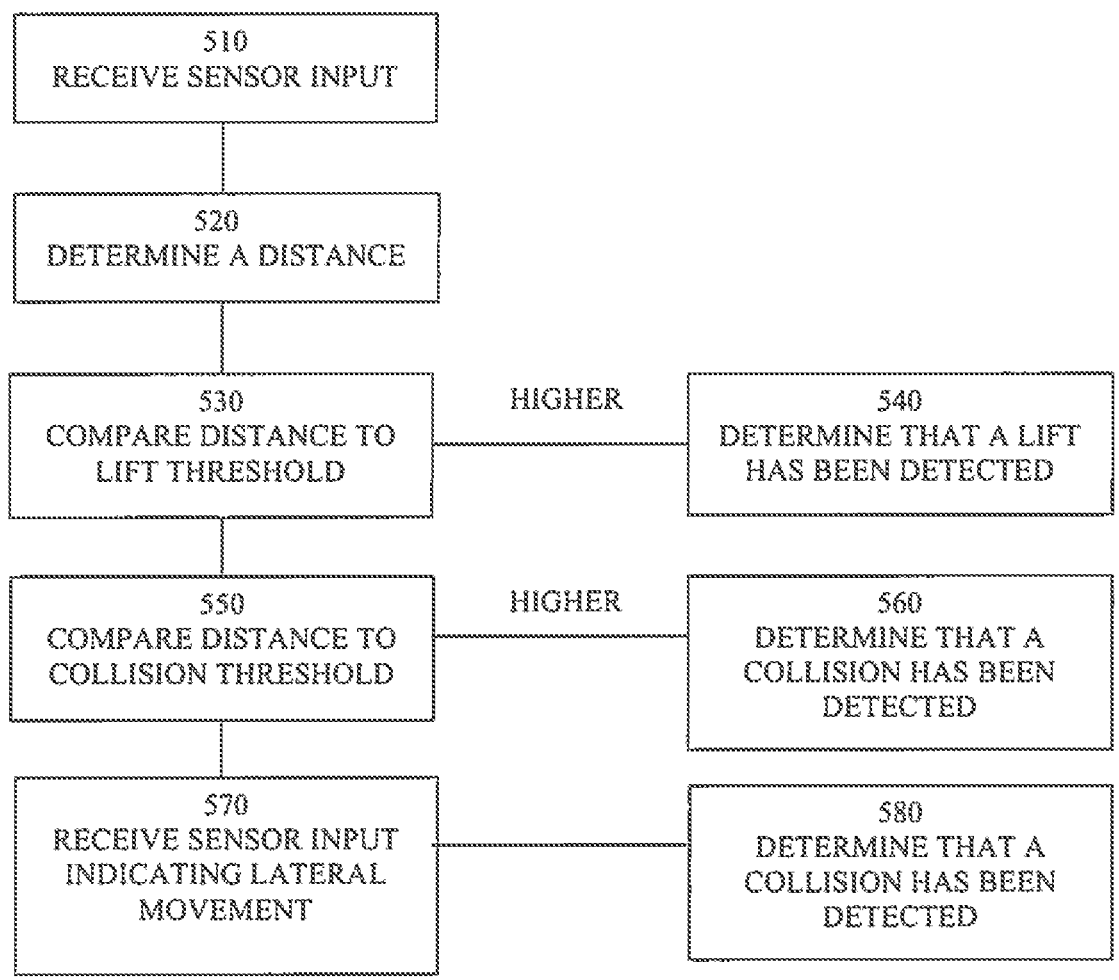
FIG. 5 shows a corresponding flowchart for a method according to an example embodiment.

FIG. 5 shows a flowchart for a general method according to herein, where a controller 110 receives 510 sensor input from a lift/collision detection device 300, and based on the sensor input determines 520 a distance between a first and a second sensor elements 340, 345. The controller 110 compares 530 the distance to a lift detection threshold d1, and if the distance is larger than the lift detection threshold d1, it is determined 540 that a lift has been detected. If the distance is not larger than the lift detection threshold d1, the controller 110 compares 550 the distance to a collision detection threshold d2, and if the distance is larger than the collision detection threshold d2, it is determined 560 that a collision has been detected.

Figure 6:
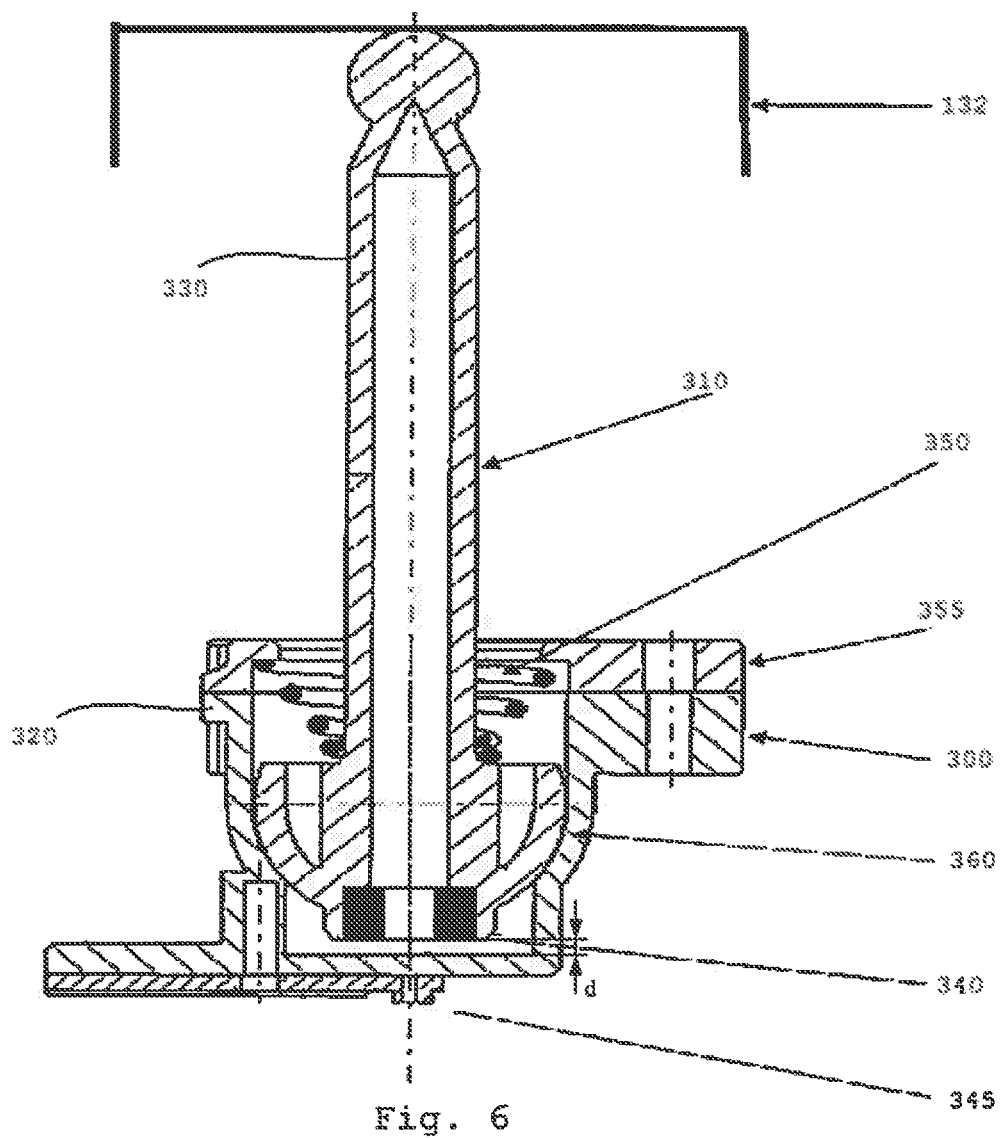
FIG. 6 is a schematic illustration of a lift/collision detection device of the robotic lawnmower of FIG. 1A, as seen in cross-section, according to a second embodiment.

FIG. 6 shows a schematic view of an alternative lift/collision detection device 300 according to one embodiment of the teachings herein. The lift/collision detection device 300 comprises a pivotable joystick member 310 which comprises a base member 320 and a lift member 330, being slidably arranged relative the base member 320. The lift member 330 comprises a first sensor element 340 and the base member 320 comprises a second sensor element 345. As for the lift/collision detection device 300 of FIG. 3, the lift element 330 is connected directly or indirectly to the cover 132 of the robotic lawnmower 100 and the base member 320 is connected to or possibly being part of the chassis 140 of the robotic lawnmower 100.

In this example embodiment, the lift member 330 is slidably arranged relative the base member 320 through a spring arrangement 350 being held in place by a spring bracket 355, the spring forcing or biasing the lift element 330 to the base member 320 and in an upright position, relative a normal use installation.

In this example embodiment the lift member 330 is pivotably arranged relative the base member 320 through a ball bearing arrangement 360.

Figure 7A:
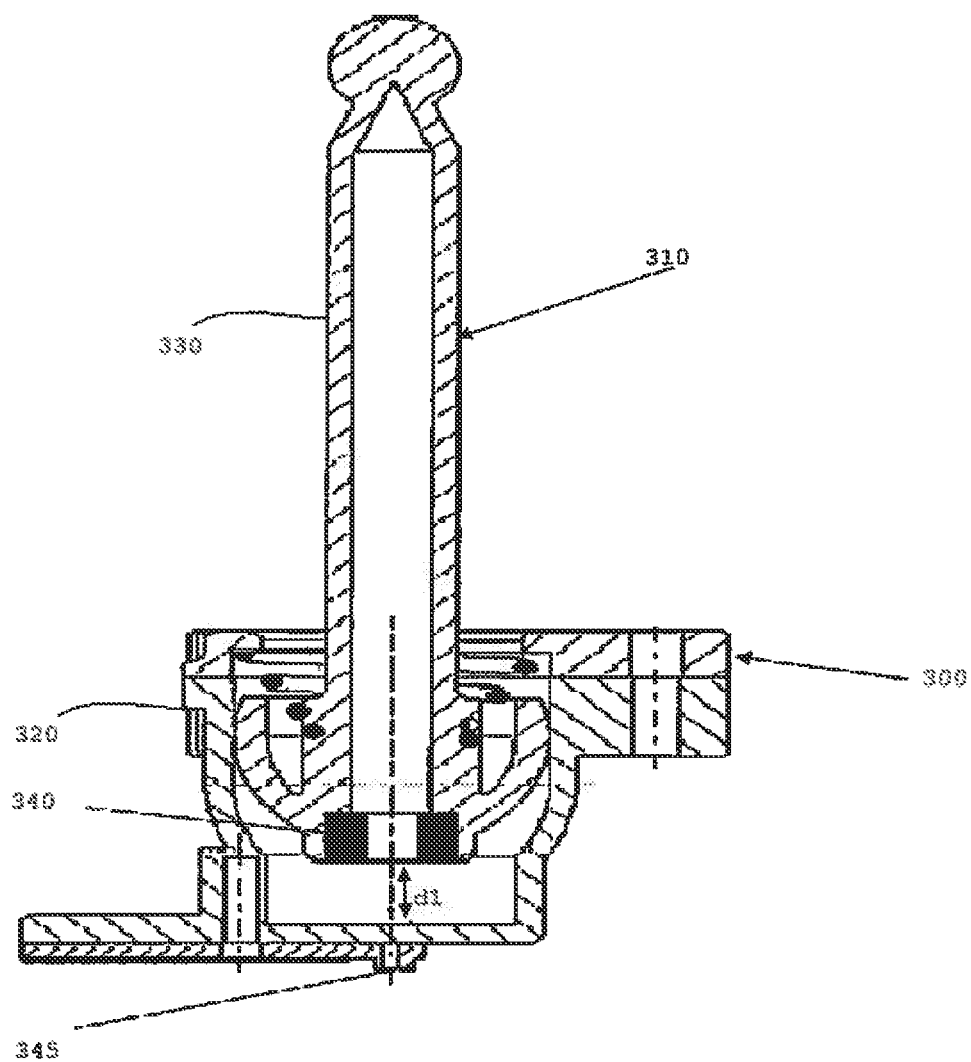
FIG. 7A is a schematic illustration of the lift/collision detection device of FIG. 6 when detecting a lift.

FIG. 7A shows the lift/collision detection device 300 according to FIG. 6, when detecting a lift. As can be seen, the lift member 330 has been lifted relative the base member 320 and the first sensor element 340 is now at a distance d1 from the second sensor element. As discussed with reference to FIGS. 4A and 5, the controller is thereby configured to determine that a lift has been detected.

Figure 7B:
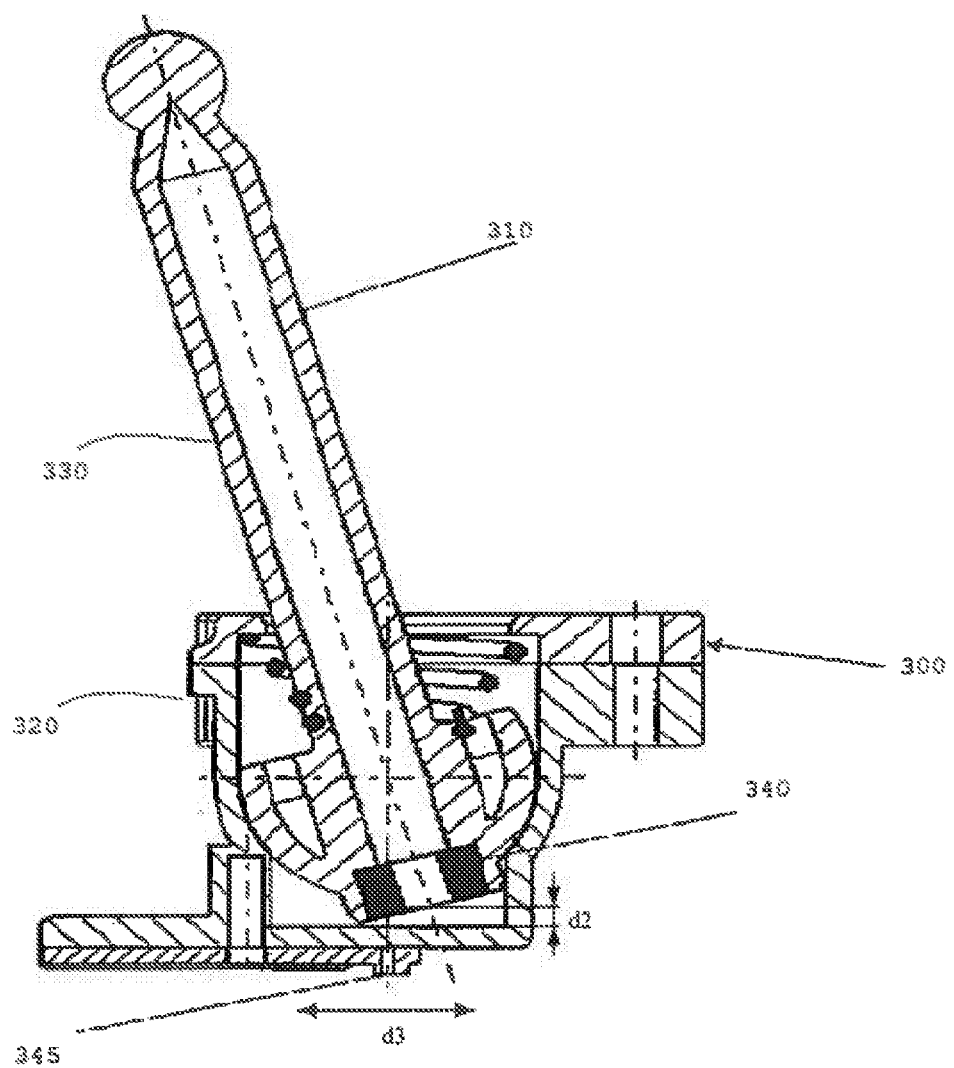
FIG. 7B is a schematic illustration of the lift/collision detection device of FIG. 6 when detecting a collision.

FIG. 7B shows the lift/collision detection device 300 according to FIG. 6, when detecting a collision. As can be seen, the joystick member has been pivoted and the lift member 330 has therefore been lifted relative the base member 320 and the first sensor element 340 is now at a distance d2 from the second sensor element. As discussed with reference to FIGS. 4B and 5, the controller is thereby configured to determine that a collision has been detected.

As for the lift/collision detection device 300 disclosed with reference to FIGS. 3, 4A and 4B, the first and second sensor elements 340, 345 may be implemented as a magnet and a Hall sensor. In one embodiment, the second sensor element 345 comprises the Hall sensor, for simplified connection of the sensor to the controller 110.

In one embodiment, the sensor element comprising the Hall sensor, may comprise a first and a second Hall sensor, arranged with different sensitivities. The distance being compared to the thresholds can then be determined as that the distance is higher than the lift threshold if none of the Hall sensors senses the magnet, and that the distance is higher than the lift threshold if only one of the Hall sensors senses the magnet.

For small lift/collision detection devices 300, the first and second sensor elements 340, 345 may be implemented as two co-operating parts of a micro switch.

In one embodiment one sensor element is a three dimensional sensor, such as a three dimensional Hall sensor, arranged to sense a movement of the corresponding magnet in three dimensions; in the XY plane (parallel with the base member) and in the Z direction (normal to the XY plane, to/from the base member 320). In such an embodiment, the controller is configured to also receive sensor input indicating a lateral (or sideways) movement of the first and second sensor elements 340, 345 relative each other.

The controller 110 may thus be further configured to determine that a collision has been detected by determining that the first and second sensor elements 340, 345 has been moved laterally relative each other. The method disclosed with reference to the flowchart of FIG. 5 may thus be complemented as that the controller receives 570 sensor input indicating a lateral movement of the first and second sensor elements 340, 345 relative each other, and in response thereto determine 580 that a collision has been detected. In one embodiment, the controller determines that a collision has been detected if the lateral movement exceeds a second collision threshold d3, such as 2, 3, 4, 5 mm or a distance between 0 and 7 mm.

In all embodiments, the thresholds may be set as software parameters so that the same type of lift/collision detection device 300 may be used for different models of robotic lawnmowers 100.

The arrangements disclosed herein all carry the benefit that a simple sensor arrangement may be used to determine both lift and collision and to differentiate between the two. The simple sensor arrangement may even comprise a single sensor, such as a Hall sensor.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool comprising a chassis, a cover and a controller for controlling the operation of the robotic work tool, the robotic work tool further comprising a lift/collision detection device connected to the controller for providing sensor input, the lift/collision detection device comprising a first sensor element and a second sensor element, the controller being configured to:
   receive sensor input of a distance value indicating a distance between the first sensor element and the second sensor element;
   determine, responsive to the distance value exceeding a lift detection threshold, that a lift has been detected, and
   determine, responsive to the distance value exceeding a collision detection threshold, that a collision has been detected,
   wherein the controller controls operation of a cutter motor configured to drive a rotating blade based on detecting the lift and detecting the collision,
   wherein the collision detection threshold is different from the lift detection threshold,
   wherein the first and second sensor elements are mechanically connected to the chassis and the cover such that a horizontal movement between the cover and the chassis changes the distance between the first sensor element and the second sensor element according to a first transmission ratio, and a vertical movement between the cover and the chassis changes the distance between the first sensor element and the second sensor element according to a second transmission ratio, and
   wherein the second transmission ratio is different from the first transmission ratio such that the horizontal movement between the cover and the chassis and the vertical movement between the cover and the chassis that have a same magnitude will result in different distance values being detected by the lift/collision detection device.

2. The robotic work tool according to claim 1, wherein the lift/collision device further comprises a pivotable member arranged to one of the cover and the chassis, a base member arranged at the other one of the cover and the chassis, wherein said pivotable member comprises said first sensor element and said base member comprises said second sensor element, wherein said first and second sensor elements are arranged at a default distance to one another, when the lift/collision detection device is at rest.

3. The robotic work tool according to claim 2, wherein the lift/collision device further comprises a relative said pivotable member slidably arranged lift member, wherein said lift member comprises said first sensor element.

4. The robotic work tool according to claim 1, wherein the controller is further configured to receive sensor input indicating a lateral movement of the first and second sensor elements relative each other, and, in response thereto, determine that a collision has been detected.

5. The robotic work tool according to claim 1, wherein the lift/collision detection device further comprises a spring for biasing the pivotable member to a neutral position.

6. The robotic work tool according to claim 5, wherein the second sensor element is attached to or at the base member, the second sensor element comprising the Hall sensor, for simplified connection of the sensor to the controller.

7. The robotic work tool according to claim 5, wherein the first sensor element is a magnet, and
   wherein the second sensor element comprises a first Hall sensor and a second Hall sensor, arranged with different sensitivities, wherein the controller is configured to compare the distance to the lift threshold and the collision threshold, by determining that the distance is higher than the lift threshold if none or a first subset of the first and second Hall sensors senses the magnet, and that the distance is higher than the collision threshold if a second subset of the first and second Hall sensors senses the magnet, wherein the first subset of the first and second Hall sensors is smaller than the second subset of the first and second Hall sensors.

8. The robotic work tool according to claim 1, wherein the first and second sensor elements are a magnet and a Hall sensor respectively.

9. The robotic work tool according to claim 1, wherein one sensor element is a three dimensional sensor arranged to sense a movement of a corresponding magnet in three dimensions; in the XY plane and in the Z direction, wherein the controller is further configured to receive sensor input indicating a lateral movement of the first and second sensor elements relative each other, and in response thereto determine that a collision has been detected.

10. The robotic work tool according to claim 1, wherein the robotic work tool is a robotic lawnmower.

11. A robotic work tool system comprising a charging station and the robotic work tool of claim 1.

12. A method for use in a robotic work tool comprising a chassis, a cover and a controller for controlling the operation of the robotic work tool, the robotic work tool further comprising a lift/collision detection device connected to the controller for providing sensor input, and which lift/collision detection device comprises a first sensor element and a second sensor element, the method comprising:
   receiving sensor input of a distance value indicating a distance between the first sensor element and the second sensor element;
   determining, responsive to the distance value exceeding a lift detection threshold, that a lift has been detected, and
   determining, responsive to the distance value exceeding a collision detection threshold, that a collision has been detected,
   wherein the controller controls operation of a cutter motor configured to drive a rotating blade based on detecting the lift and detecting the collision,
   wherein the collision detection threshold is different from the lift detection threshold,
   wherein the first and second sensor elements are mechanically connected to the chassis and the cover such that a horizontal movement between the cover and the chassis changes the distance between the first sensor element and the second sensor element according to a first transmission ratio, and a vertical movement between the cover and the chassis changes the distance between the first sensor element and the second sensor element according to a second transmission ratio, and wherein the second transmission ratio is different from the first transmission ratio such that the horizontal movement between the cover and the chassis and the vertical movement between the cover and the chassis that have a same magnitude will result in different distance values being detected by the lift/collision detection device.

\* \* \* \* \*